UNIDIRECTIONAL TAPE WINDING APPARATUS

Filed June 7, 1961 5 Sheets-Sheet 1

INVENTORS,
DONALD F. ELDRIDGE
CHARLES D. POSEY
BY Robert G. Clay
ATTORNEY

INVENTORS,
DONALD F. ELDRIDGE
CHARLES D. POSEY
BY Robert G. Clay
ATTORNEY

May 26, 1964 D. F. ELDRIDGE ETAL 3,134,551

UNIDIRECTIONAL TAPE WINDING APPARATUS

Filed June 7, 1961 5 Sheets-Sheet 3

INVENTORS,
DONALD F. ELDRIDGE
CHARLES D. POSEY

BY Robert S. Clay

ATTORNEY

UNIDIRECTIONAL TAPE WINDING APPARATUS

Filed June 7, 1961 5 Sheets-Sheet 4

INVENTORS,
DONALD F. ELDRIDGE
CHARLES D. POSEY
BY Robert G. Clay
ATTORNEY

May 26, 1964 D. F. ELDRIDGE ETAL 3,134,551

UNIDIRECTIONAL TAPE WINDING APPARATUS

Filed June 7, 1961 5 Sheets-Sheet 5

INVENTORS,
DONALD F. ELDRIDGE
CHARLES D. POSEY
BY Robert H. Clay
ATTORNEY

United States Patent Office 3,134,551
Patented May 26, 1964

3,134,551
UNIDIRECTIONAL TAPE WINDING APPARATUS
Donald F. Eldridge and Charles D. Posey, Palo Alto, Calif., assignors to Ampex Corporation, Redwood City, Calif., a corporation of California
Filed June 7, 1961, Ser. No. 115,496
6 Claims. (Cl. 242—55.18)

This invention relates to transports for strip material and particularly to tape transports requiring no rewinding operation.

In the magnetic tape recorder art, numerous arrangements have been devised for unwinding tape from a supply reel, processing the tap past a transducing head assembly, and rewinding the tape in convenient storage form. But most of these arrangements require that the tape be rewound on a separate takeup reel, and that the tape be subsequently unwound from the takeup reel and rewound on the supply reel before it is reprocessed in a new playback or recording operation. The rewinding process is inconvenient and time-consuming, and contributes nothing to the actual playing of the tape.

A further characteristic of recorders of the class above-described is that they require the two reels to rotate at different speeds, these speeds varying during the playing cycle as the diameter of the supply coil decreases and that of the takeup coil increases. Otherwise the linear velocity of the tape at the peripheries of the two coils would be unequal and slack would develop. But this need for separate parts rotating at carefully controlled differential speeds is also inconvenient and requires complicated and expensive structure.

Accordingly, it is an object of the present invention to provide a transport for a length of tape, the transport being operable to process the tape past a transducing head assembly and re-coiling the tape in a condition of readiness for immediate reprocessing without rewinding.

It is still a further object of the invention to provide a transport in which the supply and takeup coils are mounted for equi-velocity rotation on a single shaft with the pay-out and takeup radii of the coils being always equal, and the pay-out and takeup linear velocities of the tape being always equal as well.

It is still another object of the invention to provide a tape transport that requires only a single rotating part turning at a fixed velocity.

It is another object of the invention to provide an apparatus for winding strip material into a toroidal coil and for subsequently uncoiling and simultaneously re-coiling the strip in an exactly similar second coil.

It is a still further object of the invention to provide an apparatus for storing, transporting, and re-coiling a length of tape, the apparatus being arranged in a compact and convenient form, and being operable for speedy processing of the tape with a minimum of complication.

It is still another object of the invention to provide a transport apparatus as above described and adapted for inexpensive manufacture and sale, the apparatus being assembled from a minimum number of parts.

A tape transport in accordance with the present invention satisfies the foregoing and other purposes by making use of a support plate on which the tape is coiled in readiness for supply to the transducing heads, and a hub extending coaxially from the plate, to which the leading end of the tape is affixed, after being passed through the transducing head assembly, for re-coiling the tape. The plate and the hub are rotated in unison, and the tape is peeled from the inside of the coil on the plate and re-coiled on the outside of the coil on the hub, so that the radius at which the tape is being uncoiled is always the same as the radius at which it is being re-coiled, and no slack develops. At the end of the operation, the plate and hub are removed and inverted so that the new coil of tape is supported upon the plate, and the hub is pushed axially through the plate to extend again from the plate in readiness for a subsequent operation without the need for rewinding the tape.

Other objects and advantages will be explained in the following specification, considered together with the accompanying drawings, in which:

FIGURE 9 is a schematic diagram of the control circuits of the device;

Figure 1:
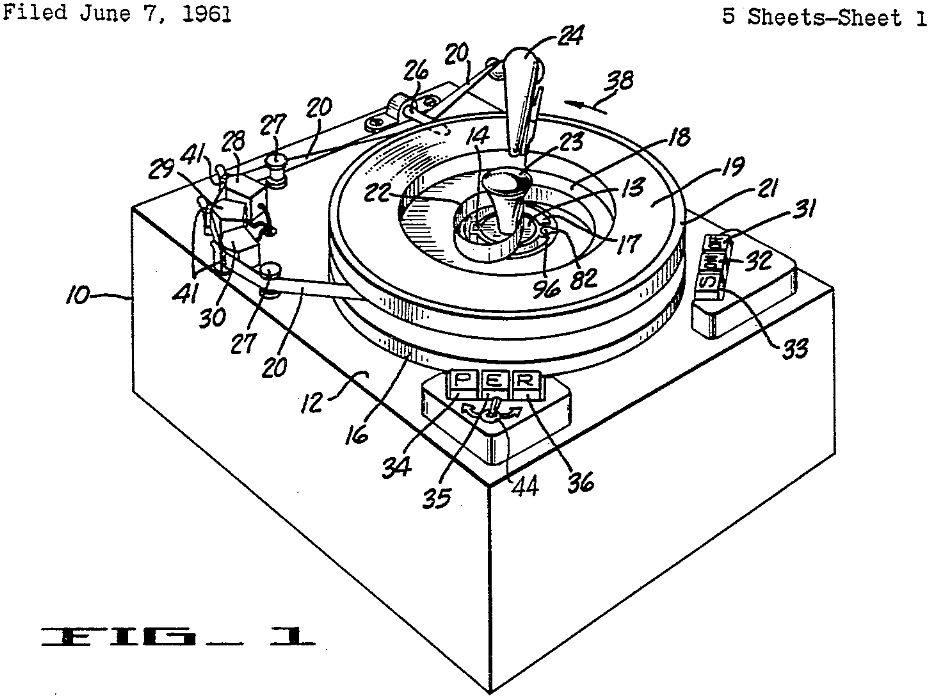
FIGURE 1 is a perspective view of a magnetic tape recording and playing machine constructed in accordance with the invention.

Referring now to FIGURE 1, there is shown a tape recorder cabinet 10 containing electronic and transport motor means 11 (see FIGURE 3) of types well known in the art. From a top plate 12 of the cabinet a vertical reel drive shaft 13 protrudes and is rotated at constant velocity by the motor means. The shaft 13 supports a lower rotating table 16, and is keyed by a key portion 14, to a hub 17 that is supported on the table 16. The hub 17 and table 16 form the takeup means for the tape of the machine, and the tape supply means is formed as follows. On the upper end of the hub 17 is affixed a coil-supporting plate 18, on which a supply coil 19 of tape 20 is mounted. A cylindrical rim element 21 is mounted at the periphery of the plate 18 to confine the tape coil 19.

To prepare the transport for operation, the inner end of the tape coil 19 is threaded in a loose loop 22 around a central guide 23 that extends upwardly from the shaft 13, and upwardly through an arm-like guide 24 in a path over and radially outwardly of the coil 19; thence downwardly outside the periphery of the rim 21, beneath a horizontal guide 26, around the first of a pair of guides 27, transducing heads 28, 29 and 30 and the second guide 27; and thence back between the lower table 16 and the plate 18 to the hub 17. In actual practice, the leading end of the tape 20 may be attached to the hub 17 while the hub and the plate 18 are removed from the machine, and the hub and plate may then be mounted on the shaft 13 and the tape loop threaded through the guides and transducing head assembly in preparation for playing. To make way for the removal of the plate 18 and hub 17, the arm-like guide 24 is pivotable to clear the periphery of the table 16. Also shown are a set of operating switch buttons including an "Off" button 31, an "On" button 32, a "Stop" button 33, a "Play" button 34, an "Erase" button 35 and a "Record" button 36.

Figure 2:
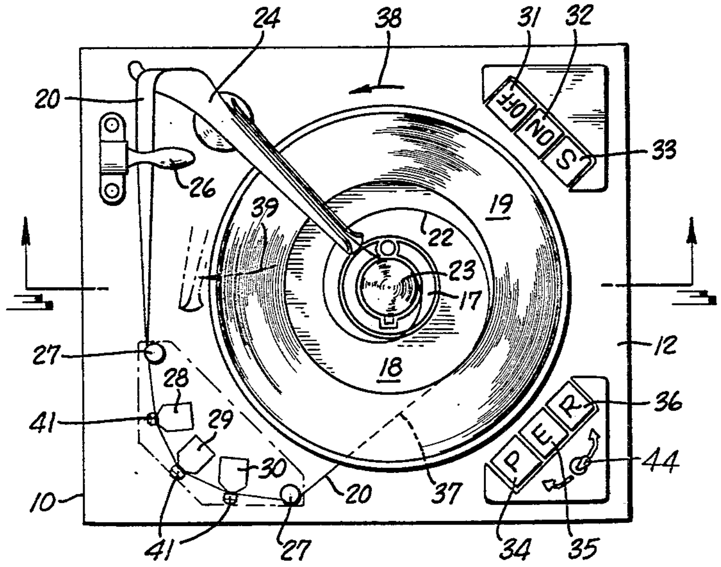
FIGURE 2 is a plan view of the apparatus shown in FIGURE 1.

Referring now to FIGURE 2 the path of the tape 20, which is more clearly shown in such figure, extends from the inside of the coil 19 in the loose loop 22 around and through the guides 23, 24, 26 and 27, across the transducing heads 28–30, and back to the outer periphery of the lower or takeup coil 37 on the hub 17 beneath the plate 18. Assuming the normal condition of operation, i.e., beginning with a full supply reel in which the inner diameter of the supply coil 19 is initially the same as the outer diameter of the hub 17, it will be seen that the radius at which the tape 20 is wound upon the takeup coil 37 is always precisely the same as the radius at which the tape is being withdrawn from the supply coil 19; and that consequently the linear velocity of the tape being added to the takeup coil is always the same as that of the tape being withdrawn from the supply coil. Thus the length of tape 20 between the two coils is always the same, and no undue slack can develop. An arrow 38 indicates the direction of rotation (counter-clockwise in this example) of the shaft 13, table 16, 17, plate 18, and the coils. An arrow 39 indicates the swinging motion of the arm-like member 24 to clear the coils when it is desired to remove the plate 18 and hub 17.

In the illustrated example, the transducing head 28 is an erase head, the head 29 is a record head, and the head 30 is a play head. The three heads are arranged between the guides 27 in such a way that the tape 20 is curved around the transducing gaps of each head in passage, to assure firm bearing contact. Each head has a pressure pad 41 mounted at the gap for pressing the tape 20 against the transducer element.

Figure 3:
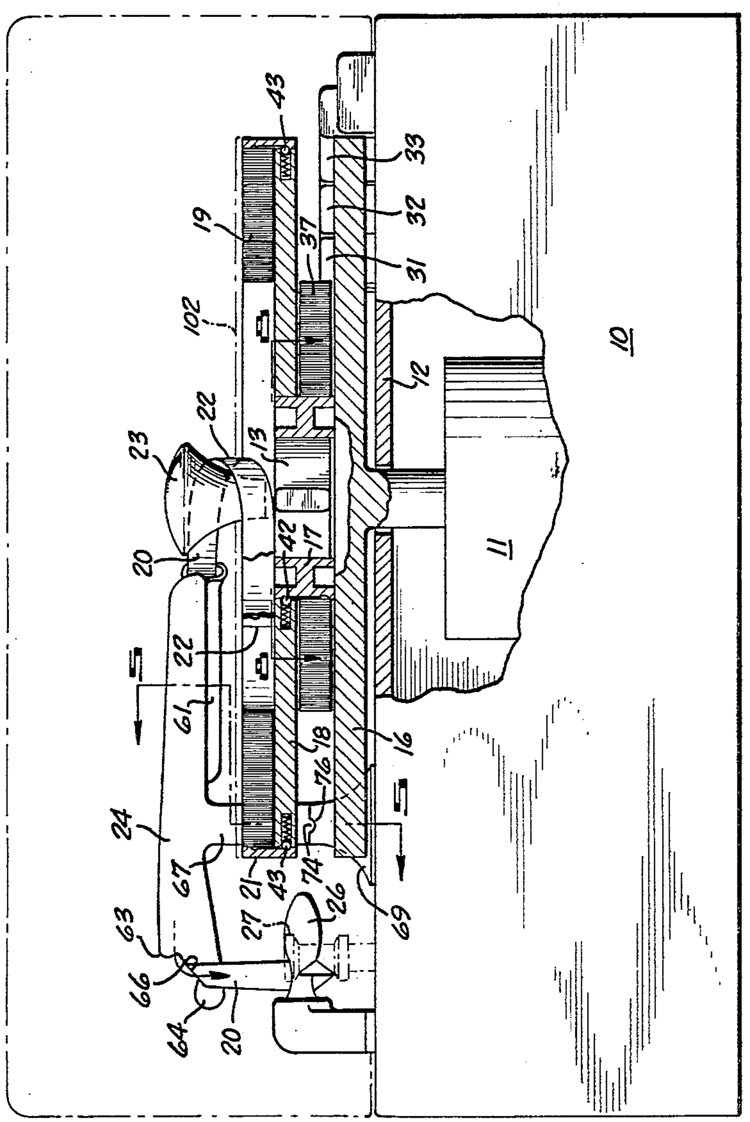
FIGURE 3 is a side elevation view, to an enlarged scale, of the apparatus shown in FIGURE 2, with the transport portion thereof shown in cross-section, the plan of the section being taken substantially along the lines 3—3 of FIGURE 2.

An important feature of the invention resides in the manner in which the tape 20 is prepared for replay after having once been run through to wind up entirely upon the hub 17 in the lower coil 37. To replay the tape 20, it is necessary to disengage the loop 22 of the tape from the guides and heads, swing the arm 24 to the side, lift the plate 18 and hub 17, together with the coil 37, from the lower table 16, and invert the plate 18, hub 17 and coil 37. The coil 37 thus becomes the upper coil 19, and is ready for replay after the plate 18 and hub 17 have been reseated on the shaft 13. But the inversion of the assembly has left the hub 17 projecting upwardly, and before these elements are reseated on the shaft 13, the hub 17 must be repositioned to extend below the plate 18. As shown in FIGURE 3, the plate 18 and the hub 17 are arranged to be axially slidable with relation to one another, the positioning of the plate 18 at either end of the hub 17 being suitably secured, as by means of a spring loaded detent 42 carried by the plate. To complete the arrangement for replaying, the rim element 21 must also be repositioned to project upwardly from the plate 18; and it will be seen that the rim 21 is also axially slidable with respect to the plate 18, the positioning of the plate at either end of the cylindrical rim also being suitably secured, as by means of spring loaded detents 43 carried by the plate. A switch 44 (FIGURE 1) is provided to reverse the direction of rotation of the shaft 13 when the tape coil is thus inverted for replay.

Figure 4:
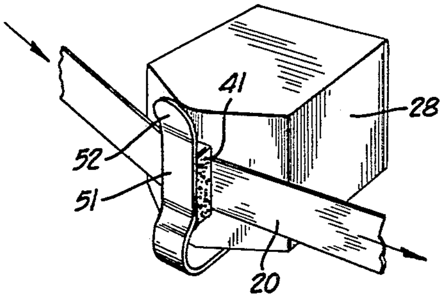
FIGURE 4 is a perspective view, to an enlarged scale of a portion of the apparatus shown in FIGURES 1 and 2.

In FIGURE 4 there are shown further details of the pressure pads 41 associated with the transducer heads 28–30. For example, the head 28 has a pad 41 made of resilient low-friction material, such as plastic, mounted on a spring clamp 51 extending from the bottom portion of the head assembly and normally holding the pad 41 tightly against the head. The upper end 52 of the clip 51 is angled outwardly to present a portion suitable for grasping to pull the pad 41 away from the head during the threading and unthreading of the tape 20.

This arrangement insures that constant tension is maintained on the tape 20 as it is drawn past the heads and serves, for this purpose, to replace the holdback tensioning mechanism usually associated with magnetic tape transports.

Figure 5:
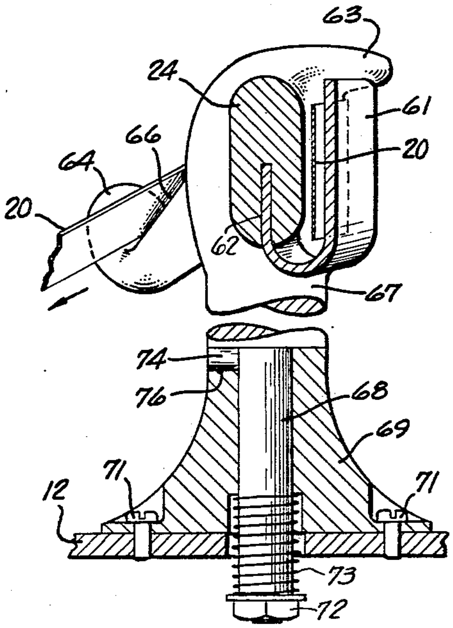
FIGURE 5 is a cross-sectional elevation view, to an enlarged scale, taken substantially along the lines 5—5 of FIGURE 3.

FIGURES 3 and 5 show further details of the guide arm 24 that conducts the tape 20 of the loose loop 22 from the guide 23 to the area of the heads 28, 29 and 30. The arm 24 is formed as an elongated member on one side of which is mounted a channel piece 61. The channel piece 61 is formed with a generally U-shaped cross-section, one wall 62 of which is solidly mounted in and extending downwardly from the lower portion of the arm 24. It will be seen that there are thus no crevices presented into which the lower edge of the moving tape 20 can penetrate and become wedged. The end of the arm 24 that is most radially outward from the axis of the shaft 13 is provided with an upper spur 63 overhanging the path of the tape 20, and a lower, radially outwardly-projecting spur 64 underlying the lower edge of the tape and presenting a 45-degree tape guiding edge 66 so that the tape in motion radially outwardly is folded to follow a path downwardly to the guide member 26.

In order to provide for proper alignment of the arm 24 in its operating position (i.e., pointed radially inwardly) and to provide for swinging motion to its inoperative position, the arm is mounted on a vertical post 67 terminated at the lower end in a shaft 68. The shaft 68 projects downwardly through a pedestal member 69 that is suitably secured to a top plate 12, as by means of fastners 71. Beneath the top plate 12 the shaft 68 projects further downwardly, and a lock nut 72 is threaded on the end thereof in spaced relation to the top plate 12. Coaxially mounted on the shaft 68 between the nut 72 and top plate 12 is a compression spring 73; and the bearing surfaces between the post 67 and pedestal 69 are respectively provided with a downwardly projecting lug 74 and mating recess 76 that serves to hold the arm in its radially extending operative position. When it is desired to swing the arm to its inoperative position, the arm and post 67 are manually lifted against the resistance of spring 73 so that the lug 74 is disengaged from the recess 76, and the arm is turned.

Figure 6:
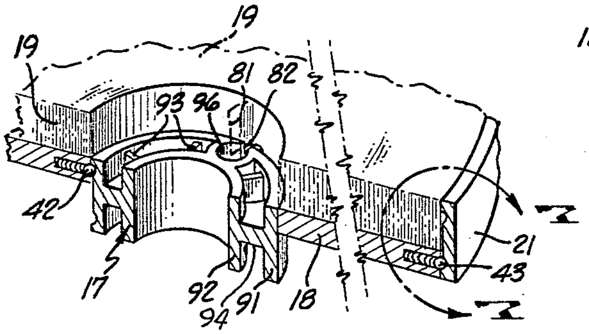
FIGURE 6 is a cross-sectional perspective view, to an enlarged scale of a portion of the apparatus shown in FIGURES 1–3.

Referring now to FIGURE 6 there is shown the condition of the coil 19, the hub 17 and the plate 18 just before the beginning of the threading operation and just after the hub 17 has been pushed downwardly in the plate 18. It will be seen that the leading end 81 of the tape 20 is freed from engagement with the hub 17 and may be manually lifted out of the central well of the tape coil 19 for the threading operation. After threading in the manner previously described, the leading end 81 is brought back in a counter-clockwise direction around the hub 17, beneath the plate 18, and secured in a slot 82 formed in the outer periphery of the hub 17. It is to be noted that after complete unwinding of the coil 19 and re-winding of the tape upon the hub 17, a reverse sliding of the hub 17 in the plate 18 automatically frees the leading end 81 of the tape for a subsequent threading operation.

It is clear from the foregoing that the leading end 81 of the tape 20 in each operation is always the same end of the tape, and that consequently no re-winding operation is ever necessary.

Figure 7:
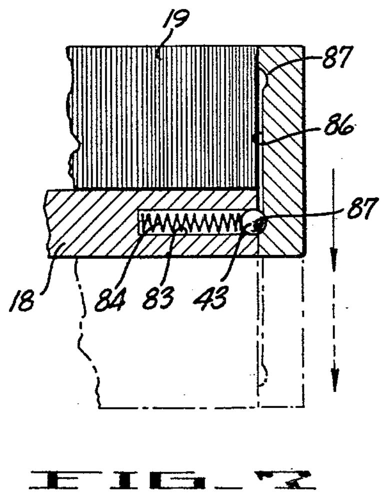
FIGURE 7 is an enlarged cross-section elevation view of the apparatus enclosed by he lines 7—7 of FIGURE 6.

FIGURE 7 shows further details of the spring loaded detents 43. Each detent 43 is formed as a ball bearing mounted in a radially directed recess 83 in the plate 18 and urged outward as by means of a compression spring 84. In the confronting wall of the rim member 21, there is formed a groove 86 parallel to the axis of the rim member 21 and terminating at each end in a well 87 for seating of the detent 43. Thus, whenever the rim member 21 is pushed in the direction of the axis of plate 18 the detent 43 is un-seated from one of the wells 87 and is guided in the groove 86 until it snaps into the other well 87, and further movement of the rim 21 with respect to the plate 18 is prevented. The plate 18 and rim 21 assembly has a minimum of three such detent assemblies equispaced around the periphery thereof. The arrangement and structure of these detents is similar to the arrangement and structure of the detents 42 between the plate 18 and the hub 17, and the above description is also applicable to the detents 42.

Figure 8:
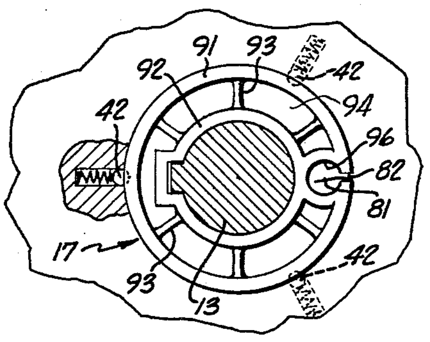
FIGURE 8 is an enlarged cross-sectional plan view, taken along the lines 8—8 of FIGURE 3.
Figure 5:
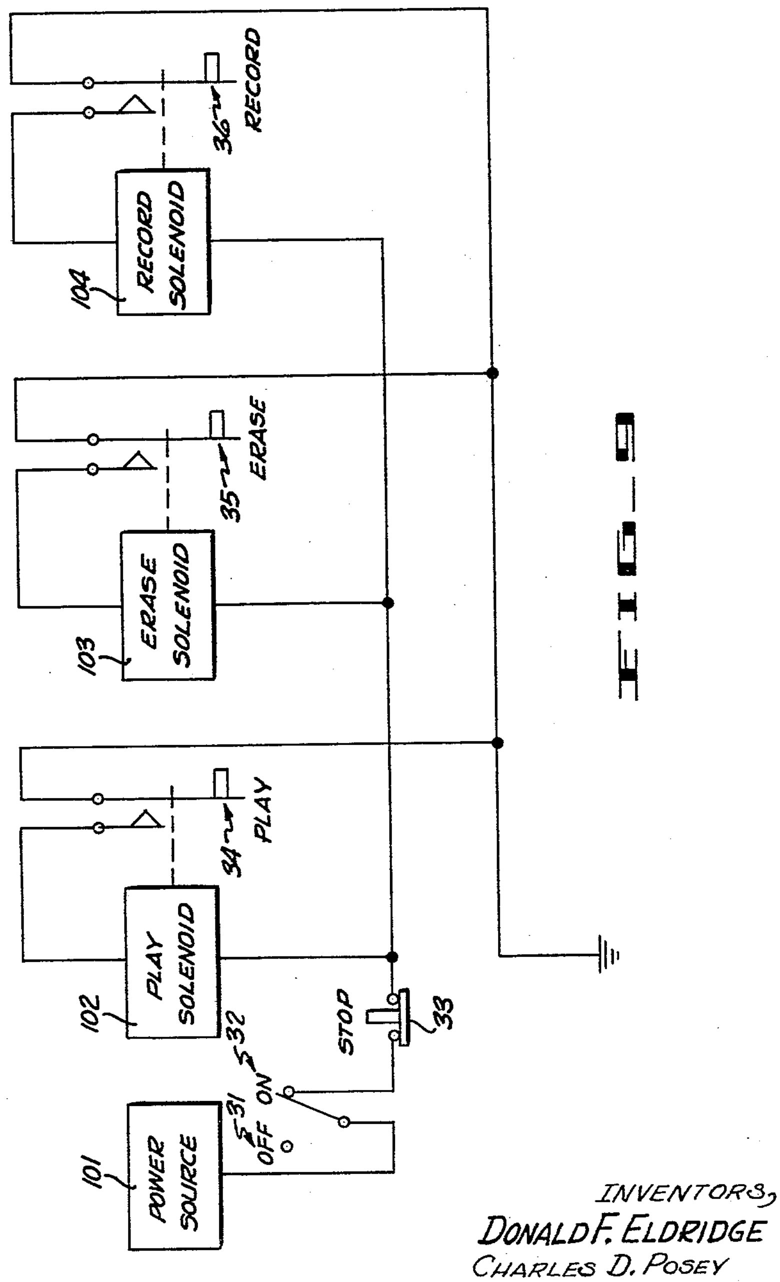

FIGURE 8 shows further details of the construction of the hub 17, which is formed as a pair of concentric cylinders 91 and 92, spaced by means of radially directed flanges 93 and a central web 94 lying in a plane normal to the axis of the hub. The web 94 has a cut-away portion 96 opposite the slot 82 to accommodate the end 81 of the tape.

An exemplary arrangement for the control circuits of the transports is shown in FIGURE 9. The "On" and "Off" buttons 31, 32 are arranged to operate a corresponding switch in a line from a power source 101. The stop switch 33 is connected in series with the power source 101 and the off-on switch 31—32. To these switches are connected in parallel a play solenoid 102, an erase solenoid 103, and a record solenoid 104, the ground lines of which are returned through the respective play, erase, and record switches 34, 35, and 36. The switches 34—36 are normally open, and each solenoid is arranged to hold its corresponding switch in a closed position once the switch has been manually closed by the operator. Each solenoid may thus be de-energized only by the breaking of the main circuit as by operation of the stop button 33. The switches 34–36 are also mechanically interlocked in a manner well known in the art, so that only one of them can be closed at a time. Each solenoid, when energized, mechanically controls the corresponding operation of the machine.

The operation of the apparatus is as follows: Tape coil 19, supported by plate 18, with rim element 21 extending upwardly from the plate and hub 17 extending downwardly from the plate, is held free of the machine while the leading end 81 of the tape 20 is withdrawn from the central well of the coil 19. The leading end 81 of the tape 20 is brought radially outwardly over the top of the coil 19, then downwardly beneath the plate 18, and is inserted in the slot 82 of the hub 17. The coil 19, plate 18 and hub 17 are then mounted on the shaft 13. The arm 24 is swung to operative position, and the loose loop 22 of tape 20 is looped around the guide 23, through the channel of the guide arm 24, downwardly over the spur 64, and beneath the guide 26, and around the heads 28–30 and the guides 27, care being taken to see that the tape passes between the tips of the heads and the pressure pads 41. The switch 32 is pressed to close the "On" switch, and then one of the operating switches 34–36 is pressed to begin operation.

If it is desired to record, for example, the switch 36 is closed so that the record solenoid 104 is locked in energized condition. The record solenoid 104 is mechanically connected to the recording mechanism of the machine and also to the motor means 11 for operation of the shaft 13. The shaft 13 is thereupon rotated to cause the coil 19 to unwind and the tape to wind up in coil 37 upon the hub 17. If at any time during the recording operation it is desired to stop the operation, the stop switch 33 is operated, breaking the circuit to the record solenoid 104. The record switch 36 may then be subsequently operated to resume the recording process or either of the other switches 34—35 may be operated to produce play or erase action.

After the coil 19 has been completely unwound and all of the tape has been wound upon the hub in coil 37, the machine is stopped, and the arm 24 is swung to inoperative position. The plate 18, hub 17 and coil 37 are then lifted as a unit from the machine and inverted. The hub 17 is then pressed to slide to the other end of its traverse with respect to the plate 18 and the rim 21 is also pressed to slide to the other end of its traverse with respect to the plate 18. The plate, hub and tape are thus put into their original condition ready for a re-run. The leading end 81 of the tape is withdrawn from the central well of the coil, and re-threaded as above described.

It will be readily understood that the apparatus may be operated either with a horizontal position of the coil 19, as shown, or with the axis of the coil horizontal and the coil in a vertical plane, by virtue of the rim member 21, which supports the coil in either position. The machine could even be operated upside down with the provision of a further support plate such as the removable, centrally apertured plate 102 shown in phantom in FIGURE 3 secured to the upper portion of the rim member 21.

Figure 10:
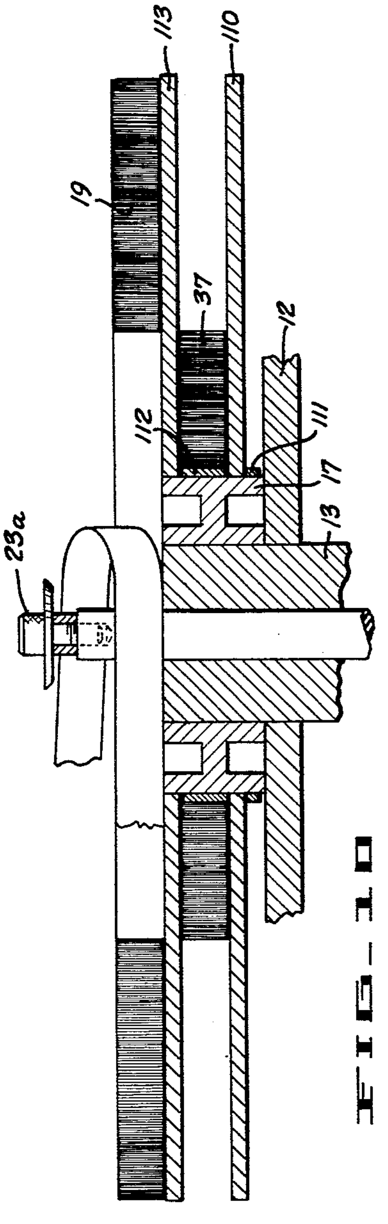
FIGURE 10 is a cross-sectional enlarged view of an alternative form of the device.

Referring now to FIGURE 10, there is shown an alternative form of the device in which the shaft 13 and hub 17 and associated drive means are substantially the same as above described, but in which the mounting and operation of the coils 19 and 37 are somewhat different. Instead of a turntable 16 for supporting the hub 17, the hub rests upon the transport top plate 12. The coil 37 is supported upon a lower plate 110 which in turn is mounted on the hub 17 as by means of a resilient tension ring 111 enclasping the hub beneath the plate 110. A cylindrical spacing member 112 is mounted on the hub 17 above the plate 110 and serves to support an upper plate 113 likewise mounted on the hub and in turn supporting the coil 19. The tape is threaded as described above from the coil 19 around a central guide 23$a$ and back to the hub 17 between the plates 110 and 113. The inner end of the coil 37 is secured to the spacing member 112 for rotation with the hub 17.

In this form of the invention, when the tape has been entirely transferred to the lower coil 37, the plates 110 and 113 are lifted vertically upward, with the coil 37 and the spacing member 112 therebetween, so as to be entirely removed from the hub 17, which remains on the shaft 13. The plate 113 is then lifted off the top of the removed assembly and separately replaced on the hub 17 so as to rest upon the ring 111 just as originally the plate 110 rested. Then, the spacing member 112 is removed from the removed assembly and replaced upon the hub 17 above the plate 113 (now the lower plate). The plate 110, still supporting the coil 37 from beneath, is then re-established upon the hub 17 above the spacing member 112, and an inner end of the coil 37 is threaded just as originally the inner end of coil 19 was threaded. Thus the lower coil 37 is arranged to become the new upper coil (supply coil) for a subsequent operation. It is to be remarked that this preparation for a subsequent operation is effected without inverting the coil 37, and that consequently the reversing switch 44 is not needed because the upper coil always feeds in the same rotational direction and reversal of the direction of rotation of shaft 13 is unnecessary.

Figure 11:
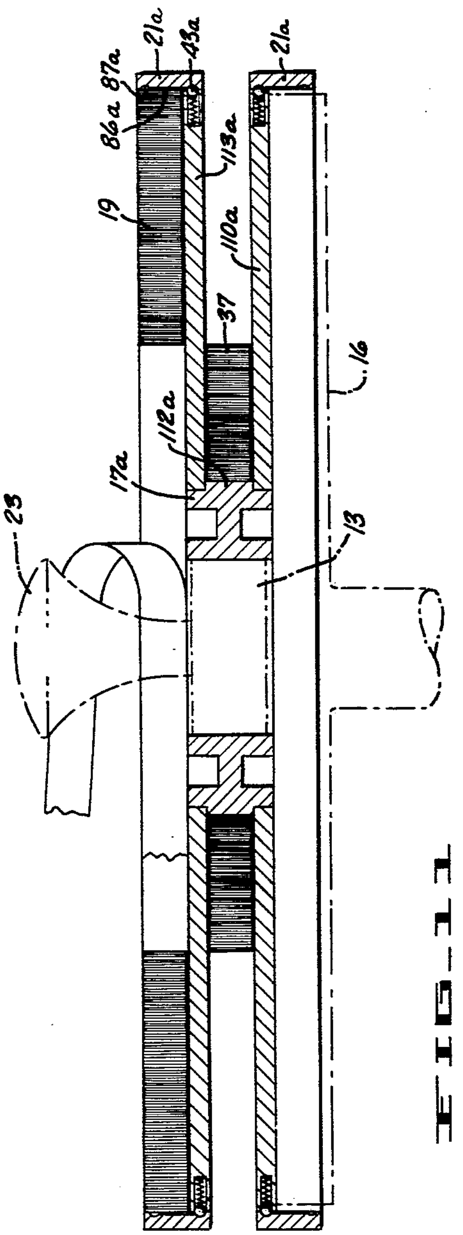
FIGURE 11 is a cross-sectional enlarged view of another form of the device.

Referring now to FIGURE 11 there is shown an improved form of the apparatus of FIGURE 10, in which the turntable 16 is a part of the apparatus as above described and serves to support the hub 17$a$ and the lower plate 110$a$. Instead of a spacing member 112 however, the hub 17$a$ is formed with an enlarged portion 112$a$ for spacing apart the plates 110$a$ and 113$a$. Also each of the plates has mounted at the periphery thereof a rim member 21$a$, mounted for axial sliding motion as by means of recesses 86$a$ and 87$a$ and spring loaded ball bearing detent members 43$a$.

In this arrangement, when the plates 110$a$ and 113$a$ are lifted from the apparatus, the hub 17$a$ is also bodily removed. The plate 113$a$ and the hub 17$a$ are then bodily separated from the plate 110$a$ and coil 37, are inverted, and are re-applied to the lower side of plate 110$a$. The rim member 21$a$ of the plate 110$a$ is then caused to slide upwardly on the plate so as to extend above the plate and around the periphery of the coil 37. The entire assembly is then re-established on the shaft 13 and a new threading and playing operation is performed. It is remarked that in this form also, the coil 37 is not inverted during change-over, and as a result the reversing switch 44 is not needed.

Thus, there has been described a strip material processing apparatus including a means (the hub 17) for winding the strip material in a toroidal coil, a means (the shaft 13 and motive means therefor) for rotating the hub for the winding action, and a means (the support plate 18) slidably coupled to the hub for supporting the coil independently of the hub during a re-winding action.

What is claimed is:

1. A processing apparatus for a length of strip material, comprising: a rotatable shaft and drive means therefor; a hub for winding said strip material into a takeup coil, said hub being coaxially slidably mounted on said shaft so as to be removable therefrom and reversibly mountable thereon, and said hub being keyed for rotation with said shaft in both of the mounted positions thereof; a plate for supporting a supply coil of said strip material, said plate being coaxially slidably mounted on said hub for movement between positions at the ends of said hub; releasable locking means for selectively holding said plate in each of said positions; and means for guiding strip material from the inner periphery of said supply coil and to the outer periphery of said takeup coil, whereby said strip may be wound into said takeup coil with said plate positioned above said takeup coil and supporting said supply coil, and said hub may thereafter be removed from said shaft and reversed thereon and said plate, supporting said takeup coil from beneath, may be repositioned at the upper end of said shaft to free said hub for a subsequent winding of said strip material thereon.

2. An apparatus as described in claim 1 and also including means mounted for rotation with said shaft beneath the lower end of said hub for supporting said takeup coil during the winding thereof on said hub.

3. An apparatus as described in claim 1 wherein said plate is circular and of outer diameter equal to the outer diameter of said supply coil; a circumferential flange member coaxially slidably mounted on said plate for confining said supply coil in the horizontal position and for supporting said supply coil in the vertical position; and releasable locking means for selectively holding said plate in positions at each end of said flange.

4. A magnetic tape recording and playing machine, comprising: a base; a plurality of magnetic recording, reading and erase transducers mounted on said base; a vertical shaft mounted for rotation on said base and drive means therefor; a hub for winding said tape into a takeup coil, said hub being coaxially slidably mounted on said shaft so as to be removable therefrom and reversibly mountable thereon, and said hub being keyed for rotation with said shaft in both of the mounted positions thereof; a first plate coaxially mounted for rotation with said shaft beneath said hub for supporting said takeup coil during the winding thereof; a second circular plate for supporting a supply coil of said tape during winding of said tape on said hub, said second plate being coaxially slidably mounted on said hub for movement between positions at the ends of said hub; releasable locking means for holding said second plate in each of said positions; and means mounted on said base and positioned in part adjacent said second plate for guiding said tape from the inner turn of said supply coil and past said transducers to said takeup coil during said winding of said tape.

5. A magnetic tape recording and playing machine, comprising: a base; a plurality of magnetic recording, reading and erase transducers mounted on said base; a vertical shaft mounted for rotation on said base and drive means therefor; a hub for winding said tape into takeup coil, said hub being coaxially slidably mounted on said shaft so as to be removable therefrom and reversibly mountable thereon, and said hub being keyed for rotation with said shaft in both of the mounted positions thereof; a first plate coaxially mounted for rotation with said shaft beneath said hub for supporting said takeup coil during the winding thereof; a second circular plate for supporting a supply coil of said tape during winding of said tape on said hub, said second plate being coaxially slidably mounted on said hub for movement between positions at the ends of said hub; releasable locking means for holding said second plate in each of said positions; a circumferential flange member for confining said supply coil, said flange member being coaxially slidably mounted on said second plate for movement between a first position extending in one axial direction from said second plate, and a second position extending in the opposite axial direction from said second plate; releasable means for holding said flange member at each of said last-named positions; and means mounted on said base and positioned in part adjacent said second plate for guiding said tape from the inner turn of said supply coil and past said transducers to said takeup coil during said winding of said tape.

6. A magnetic tape recording and playing machine, comprising: a base; a plurality of magnetic recording, reading and erase transducers mounted on said base; a vertical shaft mounted for rotation on said base and drive means therefor; a hub for winding said tape into a takeup coil, said hub being coaxially slidably mounted on said shaft so as to be removable therefrom and reversibly mountable thereon, and said hub being keyed for rotation with said shaft in both of the mounted positions thereof; a first place coaxially mounted for rotation with said shaft beneath said hub for supporting said takeup coil during the winding thereof; a second circular plate for supporting a supply coil of said tape during winding of said tape on said hub, said second plate being coaxially slidably mounted on said hub for movement between positions at the ends of said hub; releasable locking means for holding said second plate in each of said positions; a circumferential flange member for confining said supply coil, said flange member being coaxially slidably mounted on said second plate for movement between a first position extending in one axial direction from said second plate, and a second position extending in the opposite axial direction from said second plate; releasable means for holding said flange member at each of said last-named positions; and an arm mounted for horizontal swinging motion on said base between positions clearing and overhanging said second plate, said arm being provided with guide means for guiding said tape from the inner turn of said supply coil and to said transducers during said winding of said tape.

References Cited in the file of this patent

UNITED STATES PATENTS

| | | |
|---|---|---|
| 1,335,817 | Brinton | Apr. 6, 1920 |
| 1,950,601 | Droll et al. | Mar. 13, 1934 |
| 2,443,248 | Hurley | June 15, 1948 |
| 2,937,816 | Wood | May 24, 1960 |

FOREIGN PATENTS

| | | |
|---|---|---|
| 167,807 | Austria | Mar. 10, 1951 |
| 1,052,990 | France | Sept. 30, 1953 |
| 867,354 | Germany | Feb. 16, 1953 |